United States Patent
Shin et al.

(10) Patent No.: US 6,221,975 B1
(45) Date of Patent: Apr. 24, 2001

(54) PROCESS FOR PREPARING RANDOM COPOLYMER FUNCTIONALIZED AT BOTH TERMINALS

(75) Inventors: Hyeon Cheol Shin; Chang Hwan Lee, both of Taejeon (KR)

(73) Assignee: Korea Kumho Petrochemical Co., Ltd. (KR)

( * ) Notice: Subject to any disclaimer, the term of this patent is extended or adjusted under 35 U.S.C. 154(b) by 0 days.

(21) Appl. No.: 09/377,305

(22) Filed: Aug. 19, 1999

(30) Foreign Application Priority Data

Dec. 19, 1998 (KR) .................................. 98-56389

(51) Int. Cl.$^7$ ................................. C08F 8/37; C08F 8/32; C08F 8/00
(52) U.S. Cl. ................... 525/351; 525/332.8; 525/332.9; 525/333.1; 525/333.2; 525/379; 525/381; 525/382; 525/384; 525/385
(58) Field of Search ................................. 525/351, 379, 525/381, 382, 384, 385

(56) References Cited

U.S. PATENT DOCUMENTS

| | | | |
|---|---|---|---|
| 3,755,269 | 8/1973 | Uraneck et al. | 260/79.5 |
| 4,172,190 | 10/1979 | Tung et al. | 526/173 |
| 4,196,153 | 4/1980 | Tung et al. | 260/665 |
| 4,196,154 | 4/1980 | Tung et al. | 260/665 |
| 4,200,718 | 4/1980 | Tung et al. | 526/173 |
| 4,201,729 | 5/1980 | Tung et al. | 260/665 |
| 4,205,016 | 5/1980 | Tung et al. | 260/665 |
| 4,519,431 | 5/1985 | Yoshimura et al. | 152/209 |
| 4,540,744 | 9/1985 | Oshima et al. | 525/332.9 |
| 4,614,771 | 9/1986 | Watanabe et al. | 525/351 |
| 4,616,069 | 10/1986 | Watanabe et al. | 525/370 |
| 4,843,120 | 6/1989 | Halasa et al. | 525/53 |
| 5,047,483 | 9/1991 | Halasa et al. | 525/237 |
| 5,159,020 | 10/1992 | Halasa et al. | 525/237 |
| 5,281,671 | 1/1994 | Suzuki et al. | 525/212 |
| 5,317,057 | 5/1994 | Hall et al. | 524/575 |
| 5,346,962 | 9/1994 | Hergenrother et al. | 525/281 |
| 5,523,371 | 6/1996 | Lawson et al. | 526/340 |
| 5,532,327 | * 7/1996 | Bayley et al. | 526/180 |
| 5,541,264 | 7/1996 | Hsu et al. | 525/332.5 |
| 5,612,436 | 3/1997 | Halasa et al. | 526/337 |
| 5,750,055 | 5/1998 | Van Der Steen et al. | 260/665 |

FOREIGN PATENT DOCUMENTS

| | | |
|---|---|---|
| 180141 A1 | 5/1986 | (EP) . |
| 180853 A1 | 5/1986 | (EP) . |
| 349472 A1 | 1/1990 | (EP) . |
| 413294 A2 | 2/1991 | (EP) . |
| 438966 A1 | 7/1991 | (EP) . |
| 476640 A1 | 3/1992 | (EP) . |
| 510410 A1 | 10/1992 | (EP) . |
| 626278 A1 | 11/1994 | (EP) . |

OTHER PUBLICATIONS

Ohshima, N. et al, "Solution Polymerized SBR Terminated with Tin Compound (1) Polymer Design," *IRC* '85, pp. 178–192.

Nagata, N. et al, "Effect of Chemical Modification of Solution–Polymerized Rubber on Dynamic Mechanical Properties in Carbon–Black–Filled Vulcanizates," *Rubber Chemistry and Technology*, vol. 60, pp. 837–855, 1987.

Yu, Y.S. et al, "Efficiency of sec–Butyllithium /m–Diisopropenylbenzene Diadduct as an Anionic Polymerization Initiator in Apolar Solvents," *Macromolecules*, vol. 27, No. 21, pp. 5957–5963, 1994.

Yu, Y.S. et al, "Difunctional Initiator Based on 1,3–Diisopropenylbenzene. 2. Kinetics and Mechanism of the sec–Butyllithium/1,3–Diisopropenylbenzene Reaction," *Macromolecules*, vol. 29, No. 5, pp. 1753–1761, 1996.

Yu, Y.S. et al, "Difunctional Initiators Based on 1,3–Diisopropenylbenzene. 3. Synthesis of a Pure Dilithium Adduct and its Use as Disfunctional Anionic Polymerization Initiator," *Macromolecules*, vol. 29, No. 8, pp. 2738–2745, 1996.

Yu, Y.S. et al, "Difunctional Initiator Based on 1,3–Diisopropenylbenzene. 6. Synthesis of Methyl Methacrylate–Butadiene–Methyl Methacrylate Triblock Copolymers," *Macromolecules*, vol. 30, No. 15, pp. 4254–4261, 1997.

Yu, Y.S. et al, "Difunctional Initiator Based on 1,3–Diisopropenylbenzene. 5. Effect of Polar Additives and Initiator Seeding on the Synthesis of Poly(styrene–b–butadiene–b–styrene) Copolymers," *Macromolecules*, vol. 30, No. 24, pp. 7356–7362, 1997.

\* cited by examiner

Primary Examiner—Bernard Lipman
(74) Attorney, Agent, or Firm—Cook, Alex, McFarron, Manzo, Cummings & Mehler, Ltd.

(57) ABSTRACT

This invention relates to a polymer having functional groups at both terminals comprising the steps of: preparing a difunctional initiator by recating divinyl aromatic material and an organo-lithium compound in the presence of a hydrocarbon solvent; synthesizing a random copolymer derived from an aromatic vinyl and conjugated diene monomer at only one terminal of two anionic terminals; adding a polar additive to activate both terminals of said copolymer, followed by the addition of an electrophilic material. The polymer material, so prepared, has an excellent combination of properties such as improved rolling resistance for use in making tire rubber treads, since it can enhance the polymer-filler interaction.

11 Claims, No Drawings

PROCESS FOR PREPARING RANDOM COPOLYMER FUNCTIONALIZED AT BOTH TERMINALS

BACKGROUND OF THE INVENTION

1. Field of the Invention

This invention relates to a process for preparing random copolymer functionalized at both terminals and more particularly, to the process for preparing a conjugated diene-aromatic vinyl random copolymer having functional groups at both terminals using a difunctional initiator derived from a vinyl disubstituted aromatic material so that it has an excellent combination of properties such as improved rolling resistance and improved wet skid resistance for use in making tire treads.

2. Description of the Prior Art

Rubber materials for the use of tire treads in automobile should have lower rolling resistance in terms of fuel-saving purpose and higher wet skid resistance for the safety of drivers.

According to a I. R. C. report (Kyoto, 1985) released by T. Fujimaki and M. Ogawa in Bridgestone, it was reported that the rolling resistance of tire was responsible for the total energy loss in automobile by 14.4% and the only 10% reduction of rolling resistance only might contribute to saving the automobile fuel by 1–2%.

In order to reduce the rolling resistance of tire, however, a rubber material should have a very high elasticity. Also, to improve the tire traction against wet roads affecting the safety of driver, a very high wet skid resistance should be ensured. In this context, various methods have been disclosed so as to prepare a rubber which has a balanced combination of the two properties.

The first method is to control the content of a monomer and its fine structure so as to improve the physical properties, as shown in the following: According to the U.S. Pat. Nos. 4,843,120, 5,047,483 and 5,159,020 including the European Pat. Nos. 0,349,472 and 0,438,966, a method for synthesizing a rubber prepared in such a manner that conjugated diene segments having different fine structures are contained in a polymer chain so as to improve a tire traction property, has been disclosed. In addition, the U.S. Pat. No. 5,612,436 has disclosed a method of improving the traction characteristic of tire treads using an isoprene-butadiene diblock random copolymer without sacrifice of rolling resistance.

The second method is to introduce an initiator containing functional groups to a polymer, as shown below.

The European Pat. No. 0,476,640 has disclosed a method for preparing an functionalized initiator by reacting a conjugated diene and a trimetalated alkyne which in turn is prepared from the reaction between 1 equivalent of 1-alkyne and 3 equivalent of organic metal. In spite of the fact that this method can introduce functional groups at the terminal of polymer, a longer reaction time may result in reducing the activity of initiator with poor solubility. The European Pat. No. 0,626,278 has disclosed a method for utilizing an amino lithium as an initiator and the U.S. Pat. No. 5,523,371 has disclosed a method of utilizing adducts of amino-substituted aromatic materials and alkyl lithiums as initiators. However, this methods are unsuitable for industrialization in the aspect of solubility and control of activity.

The third method is to add a coupling agent or functionalizing material to a living copolymer. In particular, the U.S. Pat. Nos. 4,540,744, 5,541,264 and 4,519,431 have disclosed a method of coupling the terminal of polymer with SnCl4 so as to effectively reduce the hysteresis. Among other things, a Sn—C bond is easily decomposed and its resultant radical is easily reacted with functional groups at the surface of carbon black, thus preventing the formation of network derived from carbon particles with the formation of a polymer-carbon black bond which may result in further improvement of physical properties and processibility.

Also, several methods have been disclosed on the improvements of physical properties through end-capping of living polymer using various functionalizing materials as follows: The European Pat. No. 0,510,410 has disclosed a method of adding 0.3–4 equivalents of a substituted imine material to a living chain of diene polymer or copolymer; The U.S. Pat. No. 5,317,057 has disclosed a method of adding 0.8–1.5 equivalents of halo methyl vinyl arene to a living polymer chain; The U.S. Pat. No. 5,346,962 has disclosed a method of introducing a vinyl substituted imidazole into an terminal of polymer chain.

In particular, the U.S. Pat. No. 5,281,671 has disclosed a method for preparing a polymer which has improved breaking strength or friction resistance as well as improved rolling resistance and wet skid resistance, through introduction of N-substituted material to an active terminal of polybutadiene having 70–95 wt % of trans-1, 4-bond and blending with other conjugated diene rubbers.

The U.S. Pat. No. 4,616,069 and the European Pat. No. 0,180,141 have disclosed a method in which a conjugated diene copolymer is prepared using an organo-metallic initiator in the presence of a conjugated diene monomer or aromatic vinyl monomer and hydrocarbon solvent, while some parts of such copolymer are coupled with $SnCl_4$ and other remaining parts are reacted with amino aldehyde or amino ketone, thus improving a rolling resistance.

The U.S. Pat. Nos. 4,614,771 and 3,755,269 including the European Pat. No. 0,180,853 have disclosed a method for a diene copolymer rubber having improved rebounding property in such manner that a conjugated diene-aromatic vinyl copolymer, so prepared, is reacted with amino aldehyde or amino ketone. The material functionalized at the terminal has indicated improved physical properties and processibility for use as a tire tread rubber (ref.: Rubber Chemistry & Technology, vol. 60, pp. 837–855).

Nevertheless, all of these methods are designed to improve tire treads by introducing a functionalized material at one terminal of copolymer, to promote an interaction with a filler.

Meantime, the conventional methods for the preparation of difunctional initiator are as follows:

According to the U.S. Pat. Nos. 4,196,154, 4,201,729, 4,200,718, 4,205,016, 4,172,190 and 4,196,153 have disclosed a multifunctional lithium-containing initiator dissolved in hydrocarbon solvent and its application to the preparation of a block copolymer; The European Pat. No. 0,413,294 and the U.S. Pat. No. 5,750,055 have disclosed a method for preparing a block copolymer in such a manner that a small amount of conjugated diene is added to a difunctional initiator for preparing $\alpha,\omega$-dilithio poly (conjugated diene) solution. Techniques disclosed in these patents involved complicated reaction conditions in order to prepare a block copolymer having a vinyl content of less than 10% and small molecular weight distribution.

Further, a process for preparing a block copolymer containing 1,3-diisopropenylbenzene has been suggested (ref.: Macromolecules 1996 (vol. 29) pp. 2738–2745, 1994 (vol. 27) pp. 5957–5963, 1997 (vol. 30) pp. 4254–4261, 1997(vol.

30) pp7356–7362, 1996 (vol. 29) pp. 1753–1761). This process has suggested some laboratory conditions designed to exhibit comparable physical properties of a block copolymer such as tensile strength and elongation, which are realized through coupling or 3-step polymerization, but further improvement should still be made in terms of reaction conditions or productivity.

SUMMARY OF THE INVENTION

Under such circumstances, this invention designed to significantly enhance the polymer-filler interactions has come to introduce a process for preparing a random copolymer comprising the steps of: preparing a dilithium initiator derived from a divinyl aromatic material; polymerizing conjugated diene and vinyl aromatic monomer at one terminal of the two anionic sites of the initiator adding a functionalizing material to the living polymer with an addition of a polar additive, thus preparing a random copolymer having two functional groups at both terminals of polymer through activation of the other anionic site which was not involved in polymerization.

Therefore, an object of this invention is to provide a process for preparing random copolymer in the presence of an industrially applicable, stable difunctional initiator which can provide various functional groups to both terminals of the copolymer, with good control of the microstructure and sequence of the polymer chain.

DETAILED DESCRIPTION OF THE INVENTION

To achieve the above objective, a process for preparing random copolymer according to this invention is characterized by the following reaction steps comprising:

a random copolymer derived from an aromatic vinyl monomer and conjugated diene monomer is formed in the presence of an non-polar hydrocarbon solvent based on one of the two anionic active terminals of a difunctional organo-lithium initiator; and, a polar material and electrophilic material are added to the living polymer, so formed, to obtain a copolymer having two functional groups at both terminals of polymer.

This invention is explained in more detail as set forth hereunder.

According to this invention, only one of the two anionic sites from a difunctional initiator is activated to prepare a random copolymer and with the addition of a polar material for activating both terminals of the polymer, a electrophillic material is introduced so that a random copolymer having two functional groups at both terminals of polymer can be synthesized.

According to this invention, the polymerization steps of a random copolymer is explained in more detail as set forth hereunder.

A difunctional initiator may be made available by a common method describing that a mono organo-lithium initiator is added to a reactor in the presence of a non-polar hydrocarbon solvent and a polar additive, followed by a slow addition of a divinyl aromatic material to this solution.

For the preparation of a difunctional initiator, the examples of divinyl aromatic material selected from the group consisting of 1,3-divinylbenzene, 1,4-divinylbenzene, 1,3-diisopropenylbenzene, 1,3-dipropenylbenzene, 1,4-diisopropenylbenzene, 2,4-diisopropenyltoluene, 2,4-divinyltoluene, 1,3-distyrylbenzene, 1,4-distyrylbenzene, 1,2-distyrylbenzene, 1,3-diisobutenylbenzene and 1,3-diisopentenylbenzene; among these compounds, it is most preferred to select 1,3-diisopropenylbenzene.

Further, a non-polar hydrocarbon solvent may be employed individually or as a mixture of cyclic aliphatic hydrocarbon solvents such as cyclohexane or cyclopentane, or aliphatic hydrocarbon solvents such as n-hexane or n-heptane; among these compounds, it is most preferred to select cyclohexane.

In addition, the preferred examples of an organo-lithium initiator include n-butyl lithium, sec-butyl lithium and t-butyl lithium; it is most preferred that 2–2.5 equivalents of t-butyl lithium are employed in proportion to the 1 equivalent of the divinyl aromatic material.

The examples of a polar additive include dialkyl ether, cyclic ether and trialkyl amine; it is preferred that triethylamine is employed in the range of 0.5–1.5 equivalents in proportion to 1 equivalent of lithium ion of an organo-lithium initiator, more preferably in the range of 0.7–1.2 equivalents.

The first-step reaction for preparing a difunctional initiator is performed at the temperature of −40–40° C. for 1–10 hours, more preferably at the temperature of −40—20° C. for 1–3 hours.

The second-step reaction is that a difunctional initiator, so prepared, is added to a conjugated diene-aromatic vinyl monomer in the presence of a non-polar hydrocarbon solvent and a polar additive to activate one terminal of a difunctional initiator, thus synthesizing a random copolymer.

The most preferred examples of a non-polar hydrocarbon solvents include cyclohexane, n-hexane and n-heptane, or its mixture. Cyclic ether and dialkyl ether is employed as a randomizer in the range of 0.2–5 wt %; it is most preferred to select THF in the range of 0.5–3 wt %.

Further, a conjugated diene monomer of 4 to 8 carbon atoms may be selected from the group consisting of 1,3-butadiene, 2-methyl-1,3-butadiene, 1,3-pentadiene or 1,3-hexadiene; among these compounds, it is preferred to select 1,3-butadiene or 2-methyl-1,3-butadiene.

The example of an aromatic vinyl monomer includes styrene or α-methyl styrene; among these compounds, it is preferred to select styrene.

The second-step reaction is performed at the temperature of 40–70° C. until the conversion of monomer to polymer is more than 90%. It is preferred to perform the reaction, upto the conversion of more than 95% and the most preferred to perform upto the conversion more than 99%.

In a random copolymer which is prepared via the second-step reaction, it is preferred that its styrene content is in the range of 10–30 wt %, more preferably in the range of 15–25 wt %. Further, its vinyl content is in the range of 40–70 wt %, more preferably in the range of 40–50 wt %.

The final third-step reaction is that a polar material is added to a random polymer and then, an electrophilic material is added to the active sites of the polymer at both terminals, thus forming a polymer having functional groups at both terminals.

Ethers and tertiary amines can be used as a polar material. The detailed examples of the polar material include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N',N,N',N'-tetramethyl ethylene diamine and N,N,N',N',N"- pentamethydiethylene triamine. Less than 100 equivalents of the polar material may be used in proportion to 1 equivalent of lithium ion, most preferably in less than 10 equivalent.

Further, the examples of an electrophilic material which is added in both terminals of polymer include amino ketones, amino aldehydes, thioaminoketone, thioaminoaldehyde and amides; the electrophilic material is added to a polymer in the range of 0.5–3 equivalents in proportion to 1 equivalent of lithium ion. In particular, it is most preferred that in case of 4-dimethylaminobenzopheonone, 4-diethylaminobenzopheonone or 4,4'-bis(diethylamino) benzopheonone, 0.8–1.5 equivalents are employed in proportion to 1 equivalent of lithium ion.

The third-step reaction is performed at the temperature of 40–80° C. for 1–6 hours, more preferably at the temperature of −60–80° C. for 1–2 hours.

The applicable weight average molecular weight of a random copolymer which is prepared from the three-step reactions, is in the range of 100,000 to 500,000, preferably in the range of 200,000 to 400,000.

This invention is explained in more detail based on the following examples but is not confined to these examples.

EXAMPLE 1

To 120 ml of cyclohexane which was cooled to −30° C. in a three-necked flask equipped with a stirrer, 6.25 ml of (44.8 mmol) triethylamine and 27.5 ml of 1.7M t-BuLi (47.76 mmol) were added and stirred for 10 minutes. A mixture containing 60 ml of cyclohexane and 4ml of 1,3-diisoprophenylbenzene (23.38 mmol) was slowly added to the reacting solution. During the reaction, the reaction mixture turned to dark red and after the addition was completed, the solution was further stirred for 1 hour. 1,3-bis(1-lithio-1,3,3'-trimethylbutyl)benzene was obtained after the reaction was completed.

A small amount of 1,3-bis(1-lithio-1,3,3'-trimethylbutyl) benzene was withdrawn and quenched with methanol. Results of $^1$H-NMR analysis showing that a peak area ratio between 2.6–3.0 ppm for benzyl-based hydrogen and 7.0–7.3 ppm of aromatic hydrogen was 0.5; an area ratio between aliphatic hydrogen and aromatic hydrogen was 7.5 together with no detection of mass peak larger than 274 by GC-MS indicate that lithium diadduct was generated without formation of multilithium oligomer.

To 500 g of cyclohexane mixed with 11.3 ml of THF (10 g) in a 2 l reactor. 79.58 g of butadiene(1472.2 mmol) and 20.5g of styrene(196.83 mmol) were added and the temperature of the mixture was set at 40° C.; 1,3-bis(1-lithio-1,3,3-trimethylbutyl)benzene(0.4 mmol) was added and the reaction was maintained for 2 hours (conversion: 99%).

0.65g of dimethylamino benzophenone solution(2 mmol) in 16 g of THF(18 ml) was added to the reaction mixture and then, the reaction was performed at 60° C. for 2 hours. 15 ml of 1.0M acetic acid solution was added to the resultant solution to complete the reaction. As an antioxidant, 1.0 weight part of BHT was added to the reactant.

Weight average molecular weight(Mw)=257,000 g/mol,

Molecular weight distribution (Mw/Mn)=1.14,

Styrene content=20.8%, vinyl content=62%,

Terminal functionalization efficiency=65%

EXAMPLE 2

A difunctional initiator was prepared in the same manner as Example 1.

Apart from the above reaction, 960 g of cyclohexane and 19.2 g of THF were added to 2 l reactor and stirred. Then, 88 g of butadiene(1629.6 mmol) and 24 g of styrene(230.4 mmol) were added to the reacting solution, then the temperature was kept at 50° C. With the addition of 1,3-bis(1-lithio-1,3,3-trimethylbutyl)benzene(1.48 mmol), so formed, after the reaction was proceeded for 2 hours, 1.92 g of 4,4'-bis(diethylamino)benzophenone solution (5.92 mmol) in 19.2 g of THF (21.6 ml) was slowly added to the reaction mixture and the reaction was proceeded at 60° C. for 2 hours. 4 ml of 1.0M acetic acid solution was added to the resultant solution to complete the reaction. As an antioxidant, 1.0 weight part of BHT was added to the reactant.

Weight average molecular weight(Mw)=135,600 g/mol,

Molecular weight distribution(Mw/Mn)=1.10,

Styrene content=21.4%, vinyl content=61%

As described in the above, the process for preparing a random copolymer is a novel process comprising the steps of:

preparing a difunctional initiator derived from various types of a divinyl aromatic material which may be available industrially;

synthesizing a random copolymer by activating a difunctional initiator at the one terminal without undergoing any seeding or other complicated reactions, and;

preparing a copolymer having various functional groups by activating the polymer at both terminals with the addition of a polar material.

The polymer material, so prepared, has an excellent combination of properties such as improved rolling resistance and reduced hysteresis for use in making tire treads, since it can enhance the polymer-filler interaction.

What is claimed is:

1. A process of preparing a random copolymer functionalized at both terminals, wherein it comprises:

a random copolymer derived from an aromatic vinyl monomer and conjugated diene monomer is formed in the presence of an non-polar hydrocarbon solvent based on one of the two anionic terminals of a difunctional organo-lithium initiator; and, a polar material and electrophilic material are added to the living polymer, so formed, to obtain a copolymer having functional groups at both terminals of the polymer.

2. The process according to claim 1, wherein a reaction for preparing said random copolymer is performed in such a manner that as a randomizer, dialkyl ether or cyclic ether in the range of 0.2 to 5 wt % is employed in the presence of a non-polar hydrocarbon solvent at 40 to 70° C. until the conversion of monomer to polymer is higher than 90%.

3. The process according to claim 1, wherein said non-polar hydrocarbon solvent is selected from the group consisting of cyclohexane, cyclopentane, n-hexane and n-heptane individually or in a mixed form.

4. The process according to claim 1, wherein one or more of conjugated diene monomers is selected from the group consisting of 1,3-butadiene, 2-methyl-1,3-butadiene, 1,3-pentadiene and 1,3-hexadiene.

5. The process according to claim 1, wherein styrene or α-methylstyrene is used as an aromatic vinyl monomer.

6. The process according to claim 1, wherein said random copolymer containing 10 to 30 wt % of aromatic vinyl monomer and 40 to 70 wt % of vinyl group is prepared in the weight average molecular weight of 100,000 to 500,000.

7. The process according to claim 1, wherein the reaction steps for preparing said polymer having functional groups at both terminals polymer is performed in such a manner that with the addition of a polar material, 0.5 to 3.0 equivalents of electrophilic material are added to said living polymer in proportion to 1 equivalent of lithium counter ion of the said living polymer at 40 to 80° C. for 1 to 6 hours.

8. The process according to claim 1, wherein one or more of polar materials is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethyl ethylene diamine and N,N,N',N',N''-pentamethyldiethylene triamine; and, 100 equivalents of said polar material are employed in proportion to 1 equivalent of lithium ion.

9. The process according to claim 1, wherein one or more of electrophilic materials is selected from the group consisting of amino ketones, amino aldehydes, thioaminoketone, thioaminoaldehyde and amides; 0.5–3.0 equivalents of said electrophilic material are employed in proportion to 1 equivalent of lithium ion.

10. The process according to claim 2, wherein said non-polar hydrocarbon solvent is selected from the group consisting of cyclohexane, cyclopentane, n-hexane and n-heptane individually or in a mixed form.

11. The process according to claim 1 or 7, wherein one or more of polar materials is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethyl ethylene diamine and N,N,N',N',N''-pentamethyldiethylene triamine; and, 100 equivalents of said polar material are employed in proportion to 1 equivalent of lithium ion.

* * * * *